United States Patent
Wang et al.

(10) Patent No.: US 9,893,626 B2
(45) Date of Patent: Feb. 13, 2018

(54) SWITCHING MODE POWER SUPPLY WITH SELECTABLE CONSTANT-VOLTAGE CONSTANT-CURRENT CONTROL

(71) Applicant: SHANGHAI SIM-BCD SEMICONDUCTOR MANUFACTURING CO., LTD., Shanghai (CN)

(72) Inventors: Hu Wang, Shanghai (CN); Yajiang Zhu, Shanghai (CN); Chao Gao, Shanghai (CN); Yawei Tang, Shanghai (CN)

(73) Assignee: Shanghai SIM-BCD Semiconductor Manufacturing Co., Ltd., Shanghai (CN)

( * ) Notice: Subject to any disclaimer, the term of this patent is extended or adjusted under 35 U.S.C. 154(b) by 0 days.

(21) Appl. No.: 14/802,993

(22) Filed: Jul. 17, 2015

(65) Prior Publication Data

US 2016/0190938 A1    Jun. 30, 2016

(30) Foreign Application Priority Data

Dec. 31, 2014   (CN) .......................... 2014 1 0849527

(51) Int. Cl.
*H02M 3/335*   (2006.01)

(52) U.S. Cl.
CPC .............................. *H02M 3/33507* (2013.01)

(58) Field of Classification Search
CPC ......... H02M 3/33507; H02M 3/33515; H02M 3/33538; H02M 3/33523
See application file for complete search history.

(56) References Cited

U.S. PATENT DOCUMENTS

| | | | | |
|---|---|---|---|---|
| 5,933,334 A | * | 8/1999 | Sula | H02M 3/33507 363/21.17 |
| 8,779,746 B2 | * | 7/2014 | Ye | H02M 3/156 323/285 |

(Continued)

OTHER PUBLICATIONS

ON Semiconductor®, "NCP4328, Secondary Side CV/CC Controller," product information, Aug. 2013, 10 pages.

(Continued)

*Primary Examiner* — Timothy J Dole
*Assistant Examiner* — Sisay G Tiku

(57) ABSTRACT

A switch mode power supply (SMPS) has a primary-side controller configured to control a power switch for turning on and turning off a current flow in the primary winding. A secondary-side controller is coupled to the secondary winding for providing constant voltage (CV) and constant current (CC) control of the SMPS. The secondary-side controller is configured to receive an output selection signal and, based on the output selection signal, select a voltage reference signal from a plurality of voltage reference signals and select a current reference signal from a plurality of current reference signals. The secondary-side controller is configured to monitor an output voltage and an output current of the SMPS, and is configured to provide a turn-on signal to the primary-side controller for turning on the power switch upon determining that the output voltage is below the selected voltage reference signal and the output current is below the selected current reference signal.

21 Claims, 7 Drawing Sheets

(56) References Cited

U.S. PATENT DOCUMENTS

| | | | | |
|---|---|---|---|---|
| 9,705,408 | B2* | 7/2017 | Quigley | H02M 3/33507 |
| 2001/0015900 | A1* | 8/2001 | Preller | H02M 3/33515 |
| | | | | 363/16 |
| 2004/0075600 | A1* | 4/2004 | Vera | H02J 1/102 |
| | | | | 341/166 |
| 2005/0007069 | A1* | 1/2005 | Murakami | H02J 7/022 |
| | | | | 320/111 |
| 2008/0007226 | A1* | 1/2008 | Lu | H02J 7/0029 |
| | | | | 320/141 |
| 2008/0164837 | A1* | 7/2008 | Lu | H02J 7/045 |
| | | | | 320/107 |
| 2009/0016086 | A1* | 1/2009 | Huynh | H02M 3/33523 |
| | | | | 363/80 |
| 2009/0201705 | A1* | 8/2009 | Murata | H02M 1/32 |
| | | | | 363/53 |
| 2009/0289557 | A1* | 11/2009 | Itoh | H05B 41/2882 |
| | | | | 315/127 |
| 2011/0148319 | A1* | 6/2011 | Terazawa | H02M 3/33507 |
| | | | | 315/291 |
| 2015/0229149 | A1* | 8/2015 | Fahlenkamp | H02J 7/0044 |
| | | | | 320/114 |
| 2015/0280573 | A1* | 10/2015 | Gong | H02M 3/33523 |
| | | | | 363/21.14 |

OTHER PUBLICATIONS

STMicroelectronics "SEA05, Advance constant voltage and constant current controller," product information, Oct. 2010, 10 pages.

* cited by examiner

SWITCHING MODE POWER SUPPLY WITH SELECTABLE CONSTANT-VOLTAGE CONSTANT-CURRENT CONTROL

CROSS-REFERENCES TO RELATED APPLICATIONS

This application claims priority to Chinese Patent Application No. 201410849527.1, filed Dec. 31, 2014, commonly owned and incorporated by reference herein.

BACKGROUND OF THE INVENTION

The present invention relates generally to the field of switch mode power supply (SMPS). More particularly, embodiments of the present invention relate to SMPS for providing selectable constant output voltage and constant output current.

Switch mode power supply (SMPS) systems have many advantages over convention linear regulated power supplies. These advantages include smaller volume, better stability, and higher power efficiency. As a result, SMPS has found wide spread applications, such as televisions, set-top boxes, and video recorders, portable telephone chargers, personal digital assistants (PDAs), and even certain automated tooth brushes. In recently years, SMPS is also widely used as drivers for LED devices, including in white-light bulb replacement applications.

In some applications, it has become desirable for a single switch mode power supply to provide different output voltages and different output currents. For example, it may be desirable for a power supply to be able to provide output voltages of 5V, 9V, and 12V, etc., with different power ratings. In some conventional devices, the required voltage by the load device is received from the load by a secondary-side controller. For example, a mobile device or computer may be connected to a power supply through a USB connector which, besides the power and ground pins, may have connector pins that can be used to indicate device types. In this case, the information regarding the device type and the target voltage is conveyed to the primary side. A primary-side controller then selects a proper reference signals for comparison with feedback signals that represent the output of the power supply. The primary-side controller then performs regulation control from the primary side.

BRIEF SUMMARY OF THE INVENTION

The inventors have observed that conventional switch mode power supplies for providing selectable outputs suffer from many limitations. For example, in conventional systems using primary-side control, the selection and feedback signals are coupled from the secondary-side to the primary-side, often involve coupling of analog signals through mutual conductance or optical coupling, which can have poor dynamic response and can be susceptible to instability. Further, in conventional power supplies with primary-side control, load compensation circuitry is often needed to provide different output voltages for fine tuning and to avoid instability. Thus, the circuits are often complicated, and the performance of the power supply can suffer from noise and instability.

In embodiments of the present invention, a switch mode power supply with selectable output voltage and output current is provided, in which the selection information is received in the secondary-side controller. The secondary-side controller monitors the output voltage and current, and selects appropriate reference signals for determining whether to turn on the power switch on the primary side. For example, in some embodiments, the secondary-side controller sends the turn-on signal to the primary side to turn on the power transistor when the system output voltage is less than the desired target voltage to implement the constant-voltage (CV) control function. Here, the voltage reference signal in the secondary-side controller is selected so that the power system output voltage can be maintained at the desired target voltage. In order to implement the constant-current (CC) control function, the secondary-side controller forbids the primary-side controller to turn on the power switch by not sending the turn-on signal when the system output current exceeds a target current. Here, the current reference signal in the secondary-side controller is selected so that the power system output current can be maintained at the desired target current. In embodiments of the invention, the monitoring of system voltage and current is carried out on the secondary side and is not dependent on the coupling between the secondary and primary sides. Further, in some embodiments, the primary-side controller receives the turn-on signal by detecting the falling or rising edge of the signal and, therefore, is not susceptible to the variations in signal strength or pulse width that might be caused by the coupling between the secondary and primary sides. Moreover, in embodiments of the invention, by performing the CV and CC functions on the secondary side, the switch mode power supply with selectable output voltage and output current can operate in either discontinuous current mode (DCM) or continuous current mode (CCM).

According to some embodiments of the present invention, a switch mode power supply (SMPS) includes a transformer having a primary winding and a secondary winding, the primary winding for coupling to a power source and the secondary winding for providing an output to a load device. The power supply also has a power switch coupled to the primary winding of the transformer, and a primary-side controller coupled to the power switch and is configured to control the power switch for turning on and turning off a current flow in the primary winding. The power supply has a secondary-side controller coupled to the secondary winding for providing constant voltage (CV) and constant current (CC) control of the SMPS. The secondary-side controller is configured to receive an output selection signal and, based on the output selection signal, select a voltage reference signal from a plurality of voltage reference signals and select a current reference signal from a plurality of current reference signals. The secondary-side controller is also configured to monitor an output voltage and an output current of the SMPS to determine if the output voltage is below the selected voltage reference signal and if the output current is below the selected current reference signal. The secondary-side controller is configured to provide a turn-on signal to the primary-side controller for turning on the power switch upon determining that the output voltage is below the selected voltage reference signal and the output current is below the selected current reference signal. In the power supply, the primary-side controller is configured to turn on the power switch in response to the turn-on signal from the secondary side controller. The primary-side controller is also configured to turn off the power switch when the primary current reaches a peak primary current reference level.

In some embodiments of the above power supply, the secondary-side controller is configured to provide the turn-on signal to the primary-side controller through optical coupling. In an embodiment, the secondary-side controller is configured to provide the turn-on signal to the primary-side controller through an opto-coupler. In some embodiments, the secondary-side controller is configured to provide the turn-on signal to the primary-side controller through inductive coupling. In an embodiment, the secondary-side controller is configured to provide the turn-on signal to the primary-side controller through inductive coupling between windings in the transformer. In an embodiment, the secondary-side controller is configured to provide the turn-on signal to the primary-side controller when no current is flowing in either the primary winding or the secondary winding. In another embodiment, the secondary-side controller is configured to provide the turn-on signal to the primary-side controller through inductive coupling provided by a second transformer. In an embodiment, the secondary-side controller is configured to provide the turn-on signal to the primary-side controller when a current is flowing in either the primary winding or the secondary winding.

In another embodiment of the above power supply, the secondary-side controller also includes one or more input terminals for receiving the output selection signal, a decoder circuit for decoding the output selection signal, and a reference signal generation circuit for generating a voltage reference signal and a current reference signal based on the output selection signal. The secondary-side controller also includes a voltage sense terminal for providing information about the output voltage of the secondary winding, a current sense terminal for providing information about the current in the secondary winding. The secondary-side controller also has a control circuit. The controller circuit has a first comparator coupled to the voltage sense terminal and the voltage reference signal, a second comparator coupled to the current sense terminal and the current reference signal, and a logic circuit coupled to the first comparator and the second comparator. The logic circuit is configured to provide a the turn-on signal. The secondary-side controller also has a driver circuit configured to provide the turn-on signal to the primary-side controller for turning on the power switch.

In another embodiment, the turn-on signal from the secondary-side controller is a pulsed signal, and wherein the primary-side controller is configured to detect a fall edge or a rising edge of the pulsed signal. In another embodiment, the primary-side controller further includes a comparator circuit with one input for receiving the turn-on signal from the secondary-side controller and another input coupled to a reference signal, and a D-latch having a clock input terminal coupled to an output of the comparator circuit.

According to embodiments of the present invention, a switch mode power supply (SMPS) a transformer having a primary winding and a secondary winding, the primary winding for coupling to a power source and the secondary winding for providing an output to a load device. The SMPS also has a power switch coupled to the primary winding of the transformer, a primary-side controller coupled to the power switch to control the power switch for turning on and turning off a current flow in the primary winding, and a secondary-side controller coupled to the secondary winding for providing constant voltage (CV) and constant current (CC) control of the SMPS. The secondary-side controller is configured to receive an output selection signal and, based on the output selection signal, select a voltage reference signal from a plurality of voltage reference signals. The secondary-side controller is also configured to monitor an output voltage and an output current of the SMPS to determine if the output voltage is below the selected voltage reference signal and if the output current is below a current reference signal, and configured to provide a turn-on signal to the primary-side controller for turning on the power switch upon determining that the output voltage is below the selected voltage reference signal and the output current is below a current reference signal. Further, the primary-side controller is configured to turn on the power switch in response to the turn-on signal from the secondary side controller, and the primary-side controller is configured to turn off the power switch when the primary current reaches a peak primary current reference level.

In an embodiment of the above power supply, the secondary-side controller is further configured to, based on the output selection signal, select the current reference signal from a plurality of current reference signals.

According to an alternative embodiment of the present invention, a method for providing constant voltage (CV) and constant current (CC) control in a switch mode power supply (SMPS) is provided. The SMPS has a transformer including a primary winding and a secondary winding, a power switch coupled to the primary winding, a primary-side controller, and a secondary-side controller. The method includes, in the secondary-side controller, monitoring an output voltage and an output current of the SMPS to determine if the output voltage is below a target voltage reference signal and if the output current is below a target current reference signal, and providing a turn-on signal to the primary-side controller for turning on the power switch upon determining that the output voltage is below the target voltage reference signal and the output current is below the target current reference signal. The method also includes, in the primary-side controller, turning on the power switch in response to the turn-on signal from the secondary side.

In an embodiment, the above method also includes, in the secondary controller, receiving an output selection signal and based on the output selection signal, selecting the target voltage reference signal from a plurality of voltage reference signals and selecting the target current reference signal from a plurality of current reference signals. In another embodiment, the method also includes, in the primary controller, turning off the power switch when the primary current reaches a peak primary current reference level. In an embodiment, the method includes the secondary-side controller providing the turn-on signal to the primary-side controller through an opto-coupler. In an alternative embodiment, the method includes the secondary-side controller providing the turn-on signal to the primary-side controller through a second transformer. In another embodiment, the method also includes the primary-side controller detecting a fall edge or a rising edge of the turn-on signal from the secondary-side controller.

A further understanding of the nature and advantages of the present invention may be realized by reference to the remaining portions of the specification and the drawings.

DETAILED DESCRIPTION OF THE INVENTION

Figure 1:
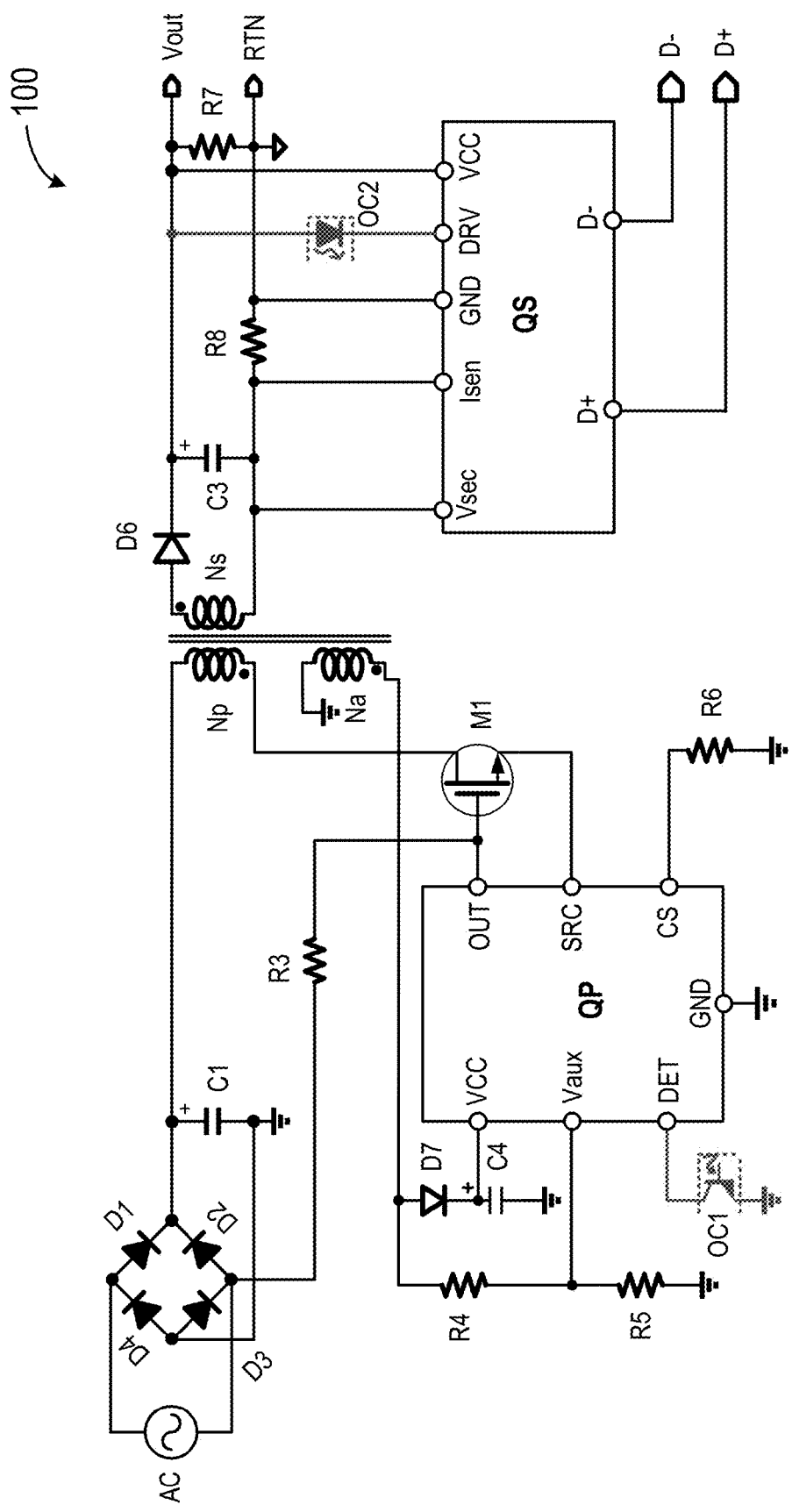
FIG. 1 is a simplified schematic diagram of switch mode power supply (SMPS) according to an embodiment of the present invention.

FIG. 1 is a simplified schematic diagram of a switch mode power supply (SMPS) in accordance with an embodiment of the present invention. As shown in FIG. 1, SMPS 100 is configured in a flyback converter topology. SMPS 100 includes a transformer that has a primary winding Np coupled in series to a power transistor M1, a secondary winding Ns, and an auxiliary winding Na. In FIG. 1, Np, Ns, and Na also designate the turn ratio in the respective windings. The primary winding is for coupling to an alternating power source AC through a rectifying circuit that includes a diode bridge formed by four diodes D1-D4 and a capacitor C1. The rectifying circuit provides rectified DC power to the SMPS. The secondary winding Ns is configured for providing an output to a load device. Power transistor, also referred to as power switch, M1 is coupled to primary winding Np for controlling the current flow in the primary winding. A primary side controller circuit QP is configured to receive a detection signal through a DET input terminal and a current sense signal through a CS input terminal. Primary side controller circuit QP is configured to turn on and turn off power transistor M1 to regulate the SMPS. When power transistor M1 is turned on, a primary current Ip builds in primary winding Np, which stores energy. The energy stored in primary winding Np is transferred to secondary winding Ns during an turn-off time interval of power transistor M1. A rectifier element coupled to secondary winding Ns, such as diode D6 and a smoothing capacitor C3, is configured to convert a secondary voltage Vs into a DC system voltage Vout to supply to a load device, represented by resistor R7 in FIG. 1.

As shown in FIG. 1, primary side controller QP includes terminals VCC, GND, Vaus, DET, CS, SRC, and OUT. Controller QP receives operating power through input terminal VCC from auxiliary winding Na. The GND terminal provides an electrical ground for the controller. Controller QP uses the Vaux terminal for sensing a voltage that is related to a current of the auxiliary winding, which represents a state of the SMPS output, through a voltage divider formed by resistors R4 and R5. The SRC terminal is coupled to a source terminal of power transistor M1. The CS terminal, in conjunction with an external resistor R6, provides a current sense signal that represent a current flow in the primary winding, also referred to as the primary current. The DET terminal is configured to receive a detection signal from the secondary side of the SMPS. As shown in FIG. 1, the DET terminal receives the selection signal from a light sensor OC1 of an opto-coupler. Light sensor OC1 provides an electrical signal in response to a light signal from a light source OC2 of the opto-coupler that is controlled by the secondary side. In embodiments of the invention, light sensor OC1 can be a phototransistor or photo diode, and light source OC2, cn be an LED (light-emitting diode).

Primary side controller QP also has an output terminal OUT for providing a control signal to turn on and turn off power switch M1.

SMPS 100 also has a secondary-side controller circuit QS. As shown in FIG. 1, secondary side controller QS includes terminals VCC, GND, Isen, Vsec, DRV, D+, and D−. The VCC terminal is coupled to the output of the secondary winding for providing power to the secondary-side controller, and the GND terminal is coupled to the ground of the secondary winding. The Isen terminal is used to sense a current in the secondary winding through a resistor R8, which is coupled to the GND terminal. The light source OC2 is connected between the output of the secondary winding and the DRV terminal of secondary-side controller QS. Further, terminals D+ and D− are configured for receiving control signals from an external source, which can come, e.g., through a USB connector.

In embodiments of the present invention, secondary-side controller QS is coupled to the secondary winding for providing constant voltage (CV) and constant current (CC) control of the SMPS. As explained further below, secondary-side controller QS is configured to receive an output selection signal. In the example of FIG. 1, the output selection signal is received at the D+ and D− terminals. Based on the output selection signal, secondary-side controller QS is configured to select a target voltage reference signal from a plurality of voltage reference signals and to select a target current reference signal from a plurality of current reference signals. Secondary-side controller QS is also configured to monitor an output voltage and an output current of the SMPS to determine if the output voltage is below the target voltage reference signal, and if the output current is below the target current reference signal. Secondary-side controller QS is further configured to provide a turn-on signal to the primary-side controller for turning on the power switch upon determining that the output voltage is below the selected voltage reference signal and the output current is below the selected current reference signal. In embodiments of the invention, primary-side controller QP is configured to turn on the power switch in response to the turn-on signal from the secondary side. In some embodiments, primary-side controller QP is configured to turn off the power switch when the primary current reaches a peak primary current reference level. In some embodiments, the secondary-side controller selects the target reference voltage from a plurality of reference voltages, but may use one fixed target reference current. Further details of primary-side controller QP and secondary-side controller QS are described below with reference to FIGS. 2 and 3.

Figure 2:
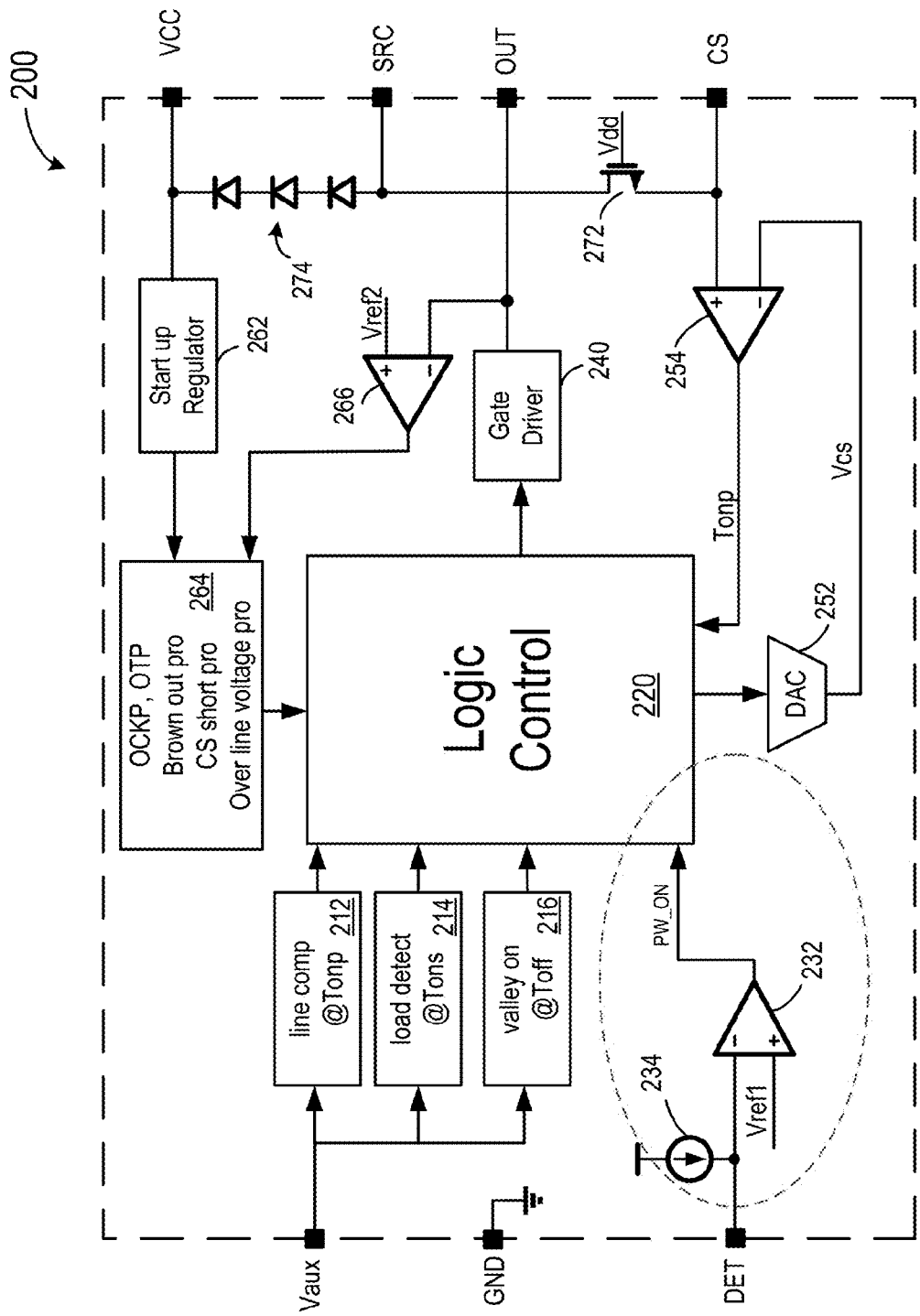
FIG. 2 is a simplified block diagram of a primary-side controller for a switch mode power supply according to an embodiment of the present invention.

FIG. 2 is a simplified block diagram of a primary-side controller for a switch mode power supply according to an embodiment of the present invention. As shown in FIG. 2, controller 200 is an example of a controller that can be used as primary-side controller QP for SMPS 100 in FIG. 1. As shown in FIG. 2, controller 200 has terminals VCC, GND, Vaus, DET, CS, SRC, and OUT. Controller 200 receives operating power through input terminal VCC and GND terminal provides an electrical ground for the controller. At the Vaux terminal, controller 200 senses a voltage related to a current of the auxiliary winding, which represents a state of the SMPS output. Several circuit blocks receive the signal from the Vaux terminal and performs various functions. For example, circuit block 212 is configured for line compensation, circuit block 214 is configured for load detect, and circuit block 216 is configured for valley on function. The outputs from these control blocks are coupled to logic control block 220, which is configured to perform various functions.

In the embodiment shown in FIG. 2, logic control block 220 is configured to issue a control signal to gate driver block 240 turn on the power switch in response to the turn-on signal from the secondary side, and is configured to turn off the power switch when the primary current reaches a peak current reference level, which is also referred to as the primary current reference level or peak primary current level. As shown in FIG. 2, the turn-on signal from the secondary side is received at the DET terminal, which is couple to a current source 234 and an input of a comparator 232. The other input of comparator 232 is couple to a reference signal Vref1. Comparator provides a PW_ON signal to logic control block 220, which is coupled to gate drive block to provide a control signal at the OUT terminal for turning on the power switch. As shown in FIG. 1, the source terminal of the power switch is coupled to the SRC terminal of the controller. Therefore, the current in the primary winding flows through terminal SRC and switch 272 to the CS terminal and an input to comparator 254. Switch 272 is controlled by Vdd which is an internal power supply in the controller, which can be derived from the VCC terminal. The other terminal of comparator 254 receives a voltage signal Vcs, which is related to a limit of the peak primary current. In the embodiment shown in FIG. 2, logic control block 220 is configured to provide the Vcs signal through a digital-to-analog converter (DAC) 252. When the current sense signal at terminal CS reaches the peak current reference signal Vcs, comparator 254 sends a signal Tonp to logic control block 220 which, through gate driver 240, sends a control signal at the OUT terminal to turn off the power switch.

Figure 3:
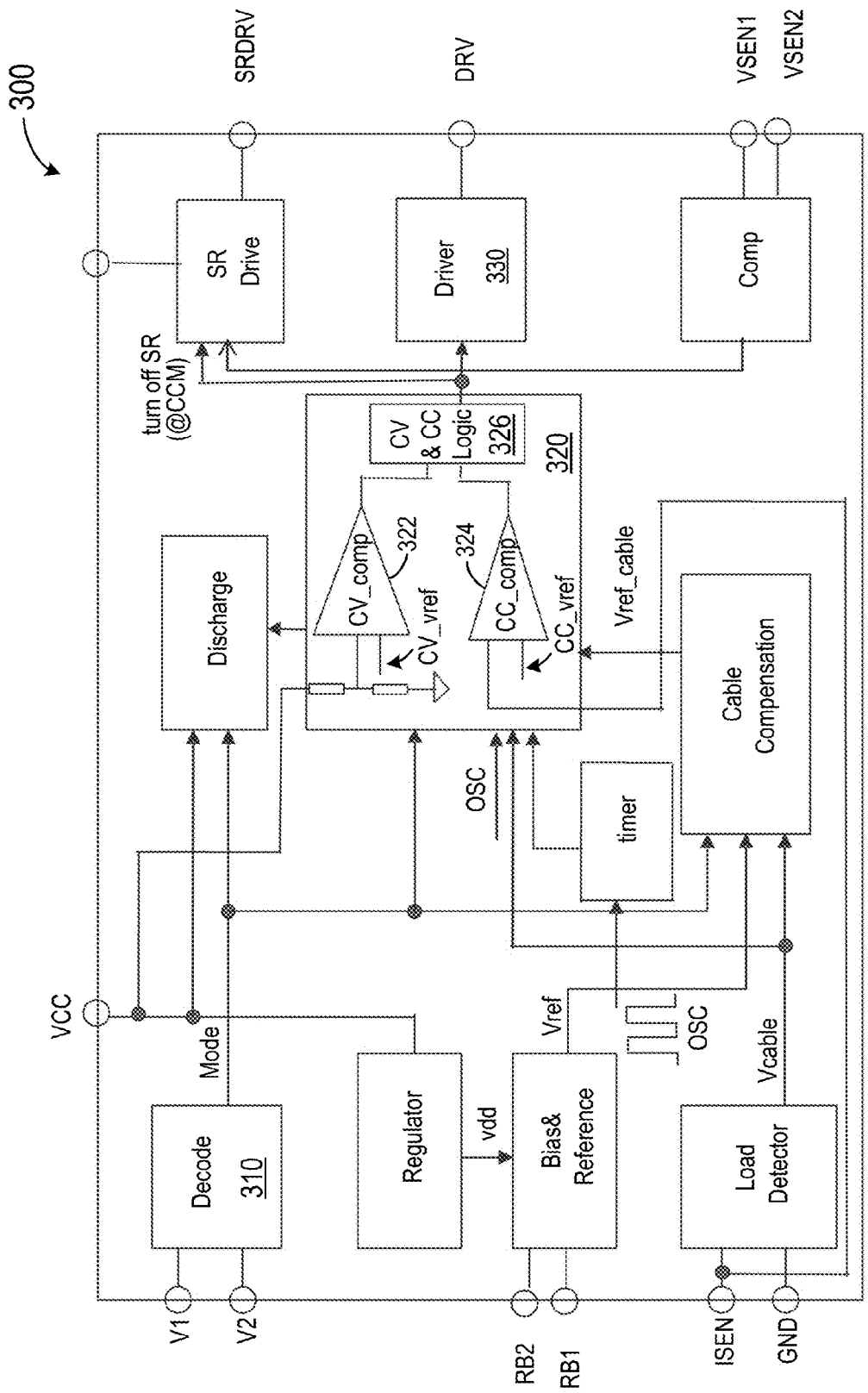
FIG. 3 is a simplified block diagram of a secondary-side controller for a switch mode power supply according to an embodiment of the present invention.

FIG. 3 is a simplified block diagram of a secondary-side controller for a switch mode power supply according to an embodiment of the present invention. As shown in FIG. 3, controller 300 is configured for constant-voltage (CV) and constant-current (CC) control operations, and is an example of a controller that can be used as secondary-side controller QS for SMPS 100 in FIG. 1. As shown in FIG. 3, controller 300 has terminals VCC, GND, ISEN, V1, V2, and DRV. The VCC terminal is configured for receiving operating power to the controller, and the GND terminal is configured to provide an electrical ground for the controller. In the example of FIG. 1, the VCC terminal of secondary-side controller QS is coupled to the output of the secondary winding for providing power to the secondary-side controller, and the GND terminal is coupled to the ground of the secondary winding. Controller 300 is also configured to receive control signals V1 and V2 at input terminals V1 and V2. In the example of FIG. 1, control signals V1 and V2 is received at the D+ and D− terminals. In some embodiments, signals V1 and V2 can be logic signals from an external device, for example, a USB connector. In the embodiment of FIG. 1, the signals at the D+ and D− terminals can represent an output selection signal. For example, the output selection signal can be used to designate a desired SMPS output voltage levels of 5V, 9V, or 12V and desired output current levels for different power ratings, e.g., 10 W or 15 W, etc. Of course, the signals at V1 and V2 can be used for other functions. As shown in FIG. 3, signals at terminals V1 and V2 are decoded at a decoder circuit 310, which outputs a Mode signal. A control circuit 320 receives the Mode signal and, based on the Mode signal, is configured to select a target voltage reference signal from a plurality of voltage reference signals and to select a target current reference signal from a plurality of current reference signals. In FIG. 3, the selected voltage reference signal CV_vref is coupled to a comparator CV_comp (322), and the selected current reference signal CC_vref is coupled to another comparator CC_comp (324). In some embodiments, the signals at V1 and V2 can be provided by the load device of the SMPS. For example, a mobile device may be connected to the power supply through a USB connection, and the D+ and D− connector in the USB device can be used to provide the signals to terminals V1 and V2. In other embodiments, the signals at terminals V1 and V2 can be provided by an external device other than the load device, for example, from a separate controller or computer. Further, even though the examples described in this disclosure use two terminals V1 and V2 to provide the selection signal, the signal can be provided with only one terminal or more than two terminals.

Controller 300 is also configured to monitor an output voltage and an output current of the SMPS. The VCC terminal is configured for providing information about the output of the SMPS, and the ISEN terminal is configured to provide information about the current in the secondary winding. In FIG. 1, the Isen terminal of secondary-side controller QS is used to sense a current in the secondary winding through a resistor R8, which is also coupled to the GND terminal. Based on information provided by comparators 322 and 324, the CV & CC logic circuit 326 in controller 300 is configured to determine if the output voltage is below the selected voltage reference signal, and if the output current is below the selected current reference signal. Control circuit 300 is further configured to provide a turn-on signal to the primary-side controller for turning on the power switch upon determining that the output voltage is below the selected voltage reference signal and the output current is below the selected current reference signal. In the embodiment of FIG. 3, the turn-on signal is generated by the Driver circuit 330, which is coupled to terminal DRV. In the example of FIG. 1, the DRV terminal of controller QS is coupled to light source OC2 for providing light to a light sensor of the opto-coupler for providing the signal to primary-side controller QP. In other embodiments, the communication between primary-side controller QP and secondary-side controller QS can be achieved by a different means, for example, through inductive coupling through a transformer. In that case Driver circuit 330 is configured to provide the appropriate signal.

As shown in FIG. 3, controller 300 also includes other terminals and circuit blocks, whose functions are described only briefly below. For example, the Regulator block is coupled to the VCC terminal for providing internal power supplies to the controller. Terminals RB1 and RB2 are configure for coupling to external resistors in conjunction with circuit block Bias & Reference for providing internal bias signals and reference signals. Terminals VSEN1, VSEN2, and DRV, along with circuit blocks Comp and SR Drive, are configured to provide support functions for an synchronous rectifier.

Figure 4:
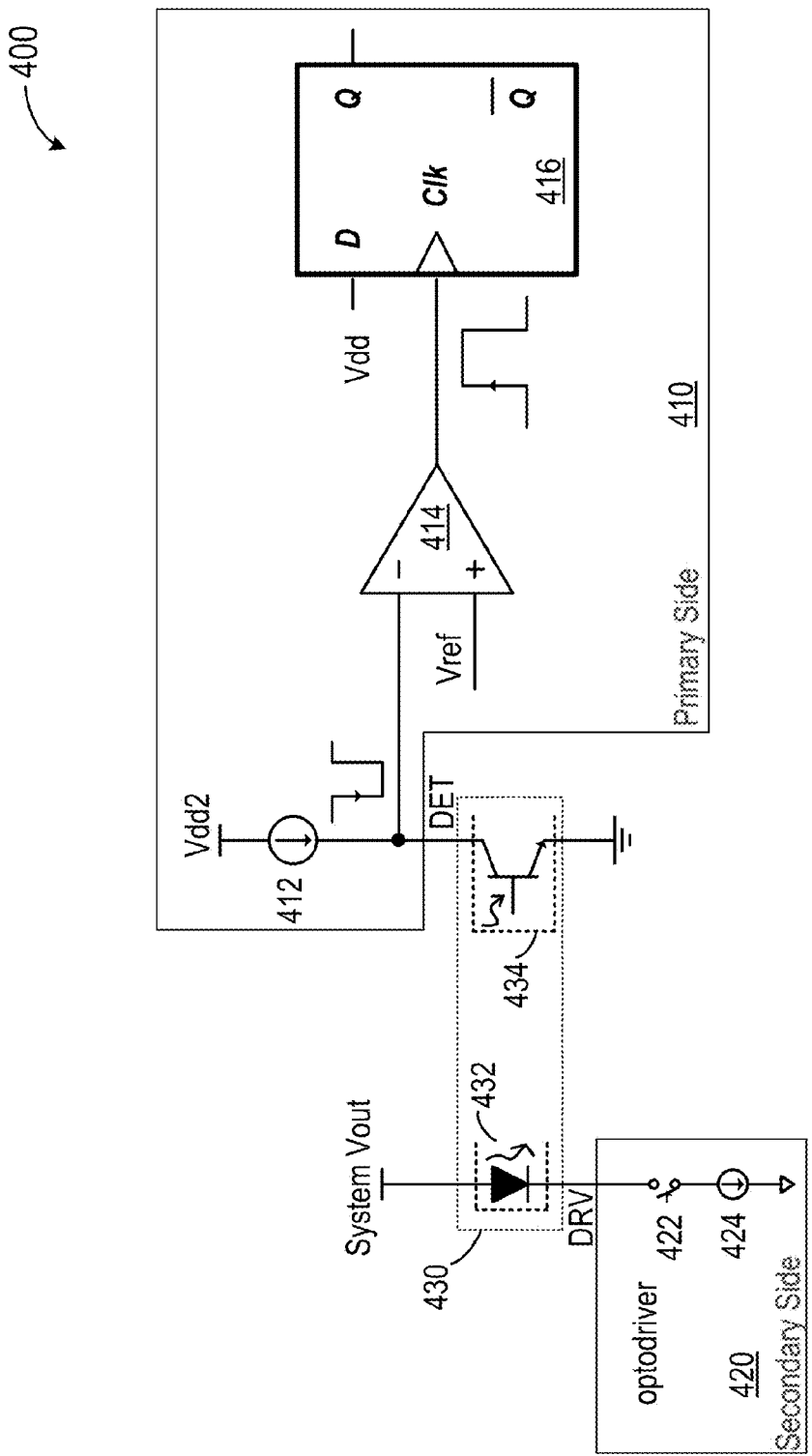
FIG. 4 is a simplified schematic diagram illustrating an interface between a primary-side controller and a secondary-side controller for a switch mode power supply according to an embodiment of the present invention.

FIG. 4 is a simplified schematic diagram illustrating an interface between a primary-side controller and a secondary-side controller for a switch mode power supply according to an embodiment of the present invention. As shown in FIG. 4, interface circuit 400 includes part of a primary-side controller 410, part of a secondary controller 420, and an opto-coupler 430. Opto-coupler 430 includes a light source 432 and a light sensor 434. Light source 432 can be an LED, and light sensor 434 can be a photodiode or phototransistor. Light source 432 is coupled to an optodriver that includes a switch 422 and a current source 424. When secondary-side controller detects a condition for activating the light source, switch 422 is turned on, causing light source 432 to emit a light signal, which is received by light sensor 434 of the opto-coupler. Primary-side controller 410 includes a current source 412, a comparator 414, and a D-latch circuit 415. As shown in FIG. 4, light source 434 is a photo-transistor which is turned on upon receiving the light signal, which changes the output of comparator 414. The output of comparator 414 turns on D-latch 415 and sends a signal to the control circuits in primary-side controller. Interface circuit 400 is an example of the interface circuit that can be used in power supply system 100 shown in FIG. 1. In power supply 100, the opto-coupler is used by secondary-side controller QS to provide a turn-on signal to the primary-side controller QP for turning on the power switch.

In some embodiments, the pull up current of current source 412 in the primary-side controller is selected such that the voltage at the DET terminal is high, when there is no current in the phototransister of the opto-coupler. On the secondary side, when the light source diode of the opto-coupler is turned on, the diode remains turned on for a short period of time, e.g., one or two microseconds in a specific embodiment. When the phototransistor is turned on, with a current greater than the current of current source 412, the voltage at the DET terminal is pulled down to about 0V. The falling edge of the DET signal is detected by comparator 414 in the primary-side controller 410. Through D-latch 415, a control signal can be provided to the power switch for turning it on. When the diode of the opto-coupler stops conducting after the short period of time, the photoconductor is turned off, and the DET terminal is pulled to change the output of comparator 414.

As shown in FIG. 4, the signal from light sensor 434 causes a pulse signal to be coupled to an input of comparator 414, which in turn provides a pulse signal to the clock terminal CLK of D-latch 416. The output of the D-latch is coupled to a control terminal of the power switch. Thus, the conditions for constant-voltage (CV) and constant-current (CC) controls are determined in the secondary-side controller. The primary-side controller QP is configured to turn on the power switch only in response to the turn-on signal from the secondary side. The system output signals detection, comparison, and decision to turn on the power switch are all made in the secondary-side controller. Further, by using a pulsed turn-on signal and detecting the signal edge, e.g., a falling edge or a rising edge, and not a signal level or a pulse width, embodiments of the invention are less sensitive to the coupling between the secondary-side controller and the primary-side controller.

In embodiments of the invention, the secondary-side controller sends the turn-on signal to the primary side to turn on the power transistor when the system output voltage is less than the desired target voltage to implement the constant-voltage (CV) control function. Here, the voltage reference signal in the secondary-side controller is selected so that the power system output voltage can be maintained at the desired target voltage. In order to implement the constant-current (CC) control function, the secondary-side controller forbids the primary-side controller to turn on the power switch by not sending the turn-on signal when the system output current exceeds a target current. Here, the current reference signal in the secondary-side controller is selected so that the power system output current can be maintained at the desired target current.

Figure 5:
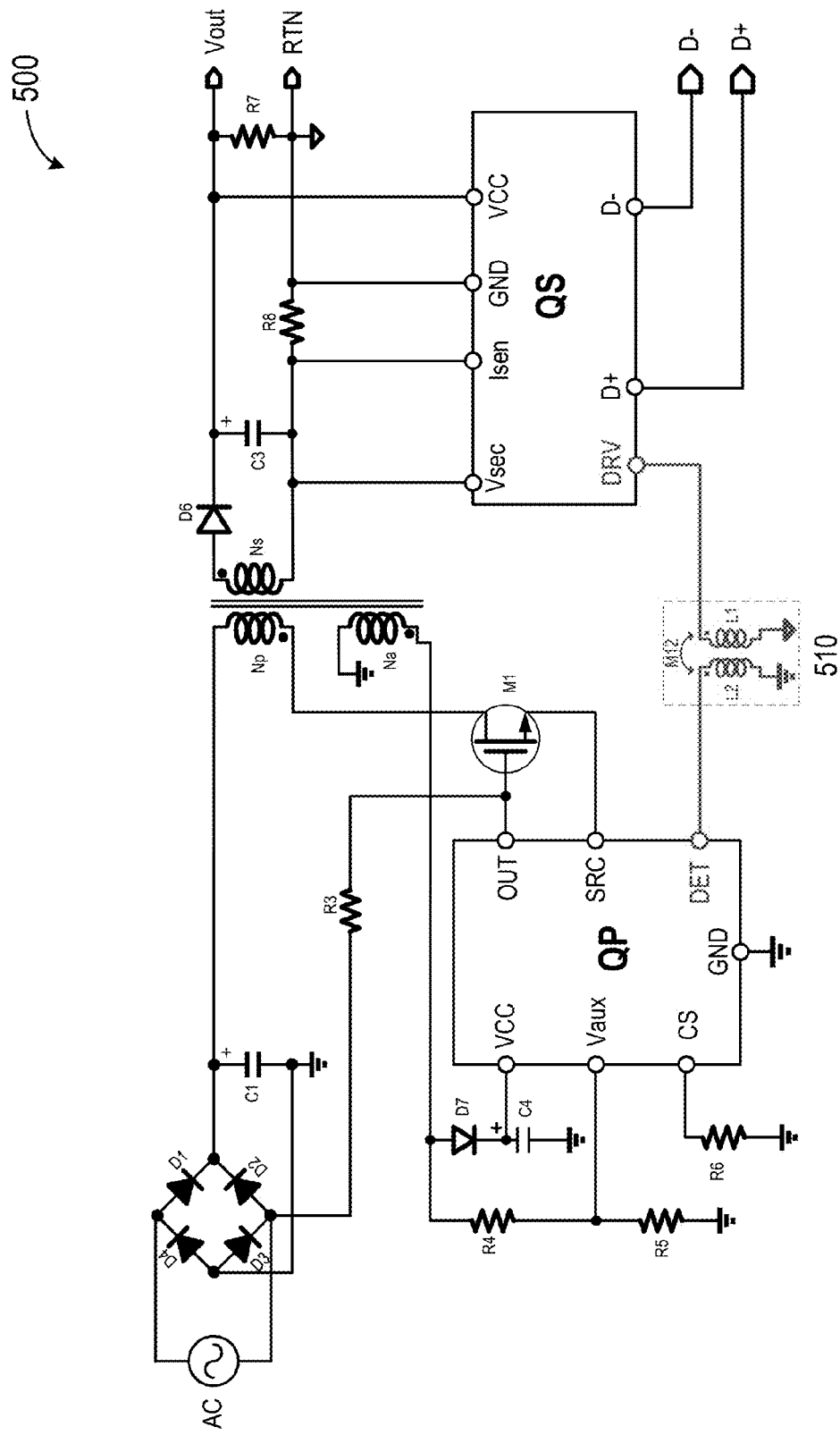
FIG. 5 is a simplified schematic diagram of switch mode power supply (SMPS) according to another embodiment of the present invention.

FIG. 5 is a simplified schematic diagram of switch mode power supply (SMPS) according to another embodiment of the present invention. As shown in FIG. 5, power supply 500 is similar to SMPS 100 of FIG. 1. A difference between power supply 500 and SMPS 100 is that the interface between primary-side controller QP and secondary-side controller QS is provided by a transformer 510 in power supply 500, instead of the opto-coupler in SMPS 100. In FIG. 5, transformer 510 is shown to have windings that have inductances L1 and L2, respectively, and a mutual inductance M12. Secondary-side controller QS can activate that transformer by providing a voltage or current at the DRV terminal causing a current to flow in inductance L1, which causes an induced current to flow in inductance L2. Primary-side controller QP receives the induced signal at terminal DET and activates the control circuit. For this embodiment, the interface circuit of FIG. 4 can be modified to operate with signals associated with a transformer, instead of the signals associated with the opto-coupler.

In the power supply of FIG. 5, the secondary-side controller is configured to provide the turn-on signal to the primary-side controller through inductive coupling between windings in a transformer. In some embodiments, the inductive coupling can be provides by a second, separate, transformer. In these embodiments, the secondary-side controller can provide the turn-on signal to the primary-side controller even when a current is flowing in either the primary winding or the secondary winding. In other words, the CV and CC control interface can be activated even then the power supply is operating in continuous current mode (CCM) when there is current flow in the main transformer. In some other embodiments, the inductive coupling can be provides by the main transformer. In these embodiments, the secondary-side controller is configured to provide the turn-on signal to the primary-side controller only when no current is flowing in either the primary winding or the secondary winding. In other words, the CV and CC control interface can be activated when the power supply is operating in discontinuous current mode (DCM) when there is no current flow in the main transformer.

Figure 6:
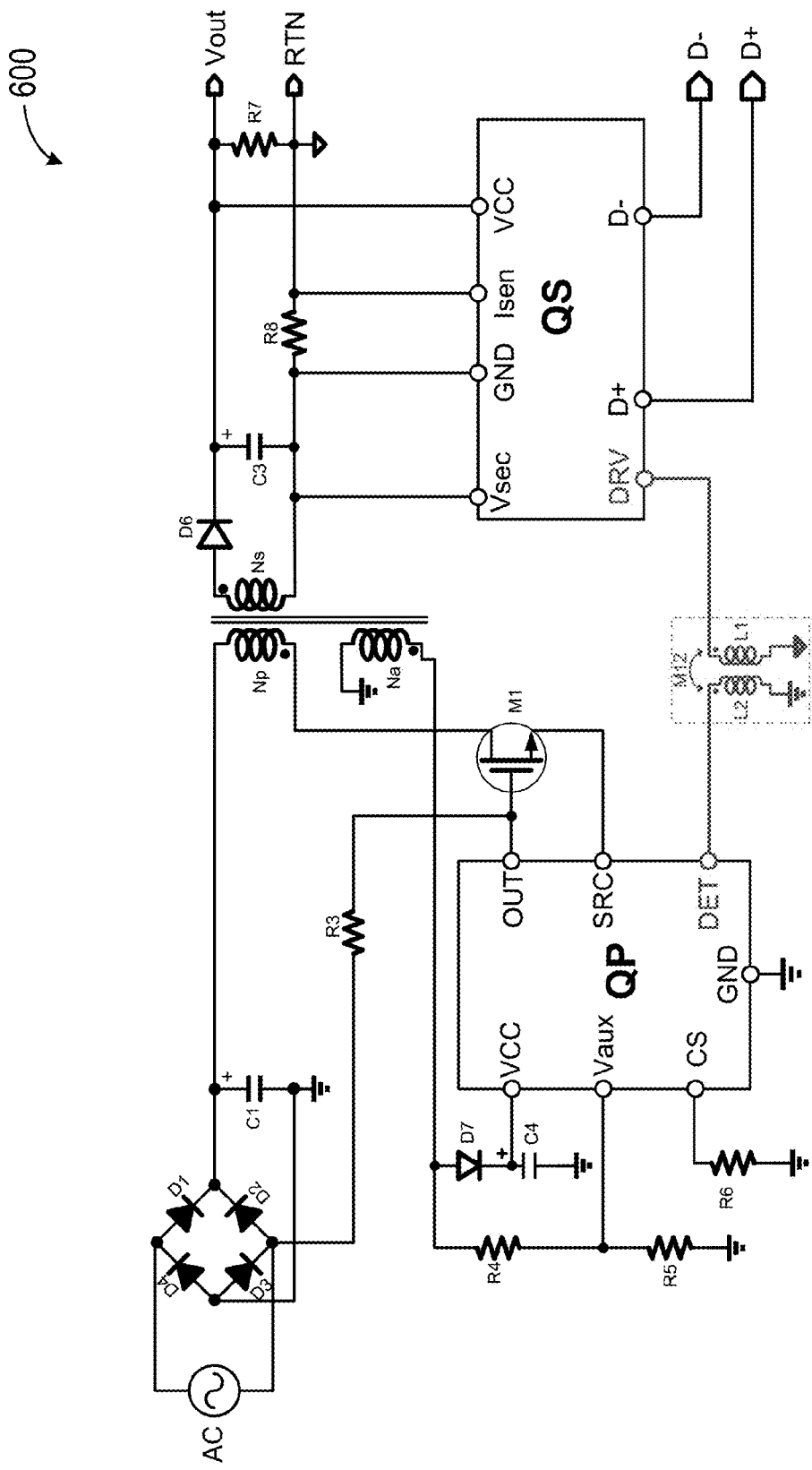
FIG. 6 is a simplified schematic diagram of switch mode power supply (SMPS) according to yet another embodiment of the present invention.

FIG. 6 is a simplified schematic diagram of switch mode power supply (SMPS) according to yet another embodiment of the present invention. As shown in FIG. 6, power supply 600 is similar to SMPS 500 of FIG. 5. A difference between power supply 600 and SMPS 500 is that, in the secondary-side controller QS, the terminals for sensing output current, Isen and GND, are now connected to opposite ends of resistor R8.

Figure 7:
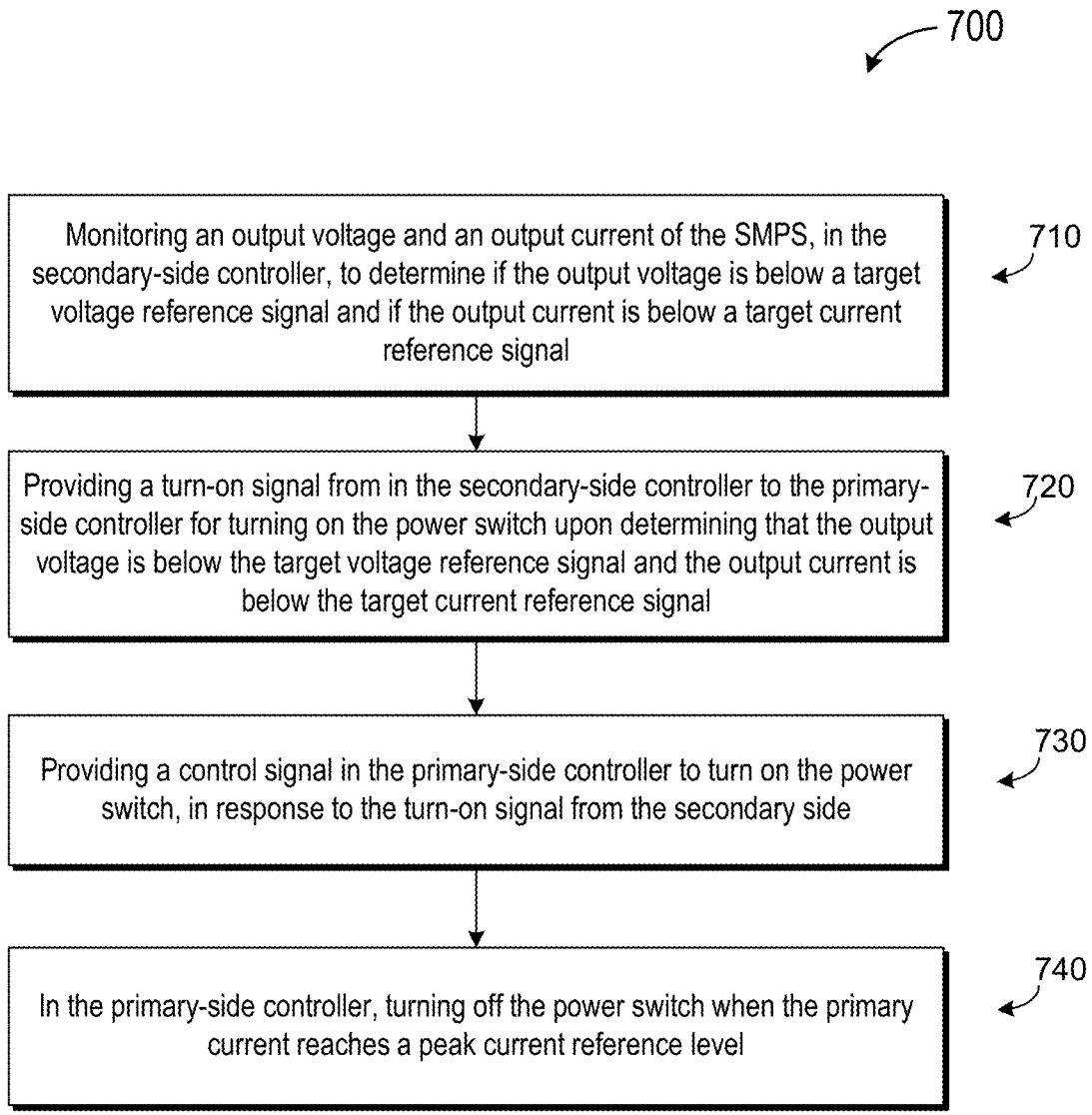
FIG. 7 is a flowchart illustrating a method for controlling an SMPS according to an embodiment of the present invention.

FIG. 7 is a flowchart illustrating a method for controlling an SMPS according to an embodiment of the present invention. As shown in FIG. 7, a method 700 for providing constant voltage (CV) and constant current (CC) control in a switch mode power supply (SMPS) is provided. The SMPS has a transformer including a primary winding and a secondary winding, a power switch coupled to the primary winding, a primary-side controller, and a secondary-side controller. The method includes, at step 710, monitoring an output voltage and an output current of the SMPS, in the secondary-side controller, to determine if the output voltage is below a target voltage reference signal and if the output current is below a target current reference signal. At step 720, the method includes providing a turn-on signal from in the secondary-side controller to the primary-side controller for turning on the power switch upon determining that the output voltage is below the target voltage reference signal and the output current is below the target current reference signal. The method includes, at step 730, providing a control signal in the primary-side controller to the power switch to turn on the power switch, in response to the turn-on signal from the secondary side. In some embodiments, the method also includes, at step 740, in the primary controller, turning off the power switch when a current in the primary winding reaches a peak current reference level.

In some embodiments, method 700 also includes, in the secondary controller, receiving an output selection signal, and based on the output selection signal, selecting the target voltage reference signal from a plurality of voltage reference signals and selecting the target current reference signal from a plurality of current reference signals. In some embodiments, the method also includes, in the secondary controller, turning off the power switch when the primary current reaches a peak current reference level. In an embodiment, the method includes the secondary-side controller providing the turn-on signal to the primary-side controller through an opto-coupler. In an alternative embodiment, the method includes the secondary-side controller providing the turn-on signal to the primary-side controller through a second transformer. In another embodiment, the method also includes the primary-side controller detecting a fall edge or a rising edge of the turn-on signal from the secondary-side controller.

Various embodiments of the present invention are described above. It is understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A switch mode power supply (SMPS), comprising:
   a transformer having a primary winding and a secondary winding, the primary winding for coupling to a power source and the secondary winding for providing an output to a load device;
   a power switch coupled to the primary winding of the transformer;
   a primary-side controller coupled to the power switch, the primary-side controller being configured to control the power switch for turning on and turning off a current flow in the primary winding, and
   a secondary-side controller coupled to the secondary winding for providing constant voltage (CV) and constant current (CC) control of the SMPS, the secondary-side controller configured to:
      receive an output selection signal at an output selection terminal, the output selection signal configured for selecting one of a plurality of values for the output;
      based on the output selection signal, select a voltage reference signal from a plurality of voltage reference signals and select a current reference signal from a plurality of current reference signals;
      monitor an output voltage and an output current of the SMPS to determine if the output voltage is below the selected voltage reference signal and if the output current is below the selected current reference signal; and
      provide a turn-on signal to the primary-side controller for turning on the power switch upon determining that the output voltage is below the selected voltage reference signal and the output current is below the selected current reference signal;
   wherein the primary-side controller is configured to turn on the power switch in response to the turn-on signal from the secondary side controller, and the primary-side controller is configured to turn off the power switch when a current in the primary winding reaches a primary current reference level.

2. The switch mode power supply of claim 1, wherein the secondary-side controller is configured to provide the turn-on signal to the primary-side controller through optical coupling.

3. The switch mode power supply of claim 2, wherein the secondary-side controller is configured to provide the turn-on signal to the primary-side controller through an opto-coupler.

4. The switch mode power supply of claim 1, wherein the secondary-side controller is configured to provide the turn-on signal to the primary-side controller through inductive coupling.

5. The switch mode power supply of claim 4, wherein the secondary-side controller is configured to provide the turn-on signal to the primary-side controller through inductive coupling between windings in the transformer.

6. The switch mode power supply of claim 5, wherein the secondary-side controller is configured to provide the turn-on signal to the primary-side controller when no current is flowing in either the primary winding or the secondary winding.

7. The switch mode power supply of claim 4, wherein the secondary-side controller is configured to provide the turn-on signal to the primary-side controller through inductive coupling provided by a second transformer.

8. The switch mode power supply of claim 7, wherein the secondary-side controller is configured to provide the turn-on signal to the primary-side controller when a current is flowing in either the primary winding or the secondary winding.

9. The switch mode power supply of claim 1, wherein the secondary-side controller further comprises:
   one or more input terminals for receiving the output selection signal;
   a decoder circuit for decoding the output selection signal;
   a reference signal generation circuit for generating a voltage reference signal and a current reference signal based on the output selection signal;
   a voltage sense terminal for providing information about the output voltage of the secondary winding;
   a current sense terminal for providing information about the current in the secondary winding;
   a control circuit including:
      a first comparator coupled to the voltage sense terminal and the voltage reference signal;
      a second comparator coupled to the current sense terminal and the current reference signal; and
      a logic circuit coupled to the first comparator and the second comparator and being configured to provide a the turn-on signal;
   a driver circuit configured to provide the turn-on signal to the primary-side controller for turning on the power switch.

10. The switch mode power supply of claim 1, wherein the turn-on signal from the secondary-side controller is a pulsed signal, and wherein the primary-side controller is configured to detect a fall edge or a rising edge of the pulsed signal.

11. The switch mode power supply of claim 1, wherein the primary-side controller further comprises:
   a comparator circuit with one input for receiving the turn-on signal from the secondary-side controller, and another input coupled to a reference signal; and
   a D-latch having a clock input terminal coupled to an output of the comparator circuit.

12. A switch mode power supply (SMPS), comprising:
a transformer having a primary winding and a secondary winding, the primary winding for coupling to a power source and the secondary winding for providing an output to a load device;
a power switch coupled to the primary winding of the transformer;
a primary-side controller coupled to the power switch, the primary-side controller being configured to control the power switch for turning on and turning off a current flow in the primary winding, and
a secondary-side controller coupled to the secondary winding for providing constant voltage (CV) and constant current (CC) control of the SMPS, the secondary-side controller configured to:
receive an output selection signal at an output selection terminal, the output selection signal configured for selecting one of a plurality of values for the output;
based on decoding the output selection signal at a decoder circuit, select a voltage reference signal from a plurality of voltage reference signals;
monitor an output voltage and an output current of the SMPS to determine if the output voltage is below the selected voltage reference signal and if the output current is below a current reference signal; and
provide a turn-on signal to the primary-side controller for turning on the power switch upon determining that the output voltage is below the selected voltage reference signal and the output current is below a current reference signal;
wherein the primary-side controller is configured to turn on the power switch in response to the turn-on signal from the secondary side controller, and the primary-side controller is configured to turn off the power switch when a current in the primary winding reaches a primary current reference level.

13. The switch mode power supply of claim 12, wherein the secondary-side controller is further configured to, based on the output selection signal, select the current reference signal from a plurality of current reference signals.

14. The switch mode power supply of claim 12, wherein secondary-side controller is configured to provide the turn-on signal to the primary-side controller through an opto-coupler.

15. The switch mode power supply of claim 12, wherein the secondary-side controller is configured to provide the turn-on signal to the primary-side controller through inductive coupling provided by a second transformer.

16. A method for providing constant voltage (CV) and constant current (CC) control in a switch mode power supply (SMPS), which has a transformer including a primary winding and a secondary winding, a power switch coupled to the primary winding, a primary-side controller, and a secondary-side controller, the method comprising:
in the secondary-side controller,
receiving an output selection signal, the output selection signal configured for selecting one of a plurality of values for the output;
based on decoding the output selection signal at a decoder circuit, selecting a target voltage reference signal from a plurality of voltage reference signals and selecting a target current reference signal from a plurality of current reference signals;
monitoring an output voltage and an output current of the SMPS to determine if the output voltage is below the target voltage reference signal and if the output current is below the target current reference signal; and
providing a turn-on signal to the primary-side controller for turning on the power switch upon determining that the output voltage is below the target voltage reference signal and the output current is below the target current reference signal,
and
in the primary-side controller,
providing a control signal to turn on the power switch in response to the turn-on signal from the secondary side.

17. The method of claim 16, further comprising:
in the secondary controller,
receiving an output selection signal;
based on the output selection signal, selecting the target voltage reference signal from a plurality of voltage reference signals and selecting the target current reference signal from a plurality of current reference signals.

18. The method of claim 16, further comprising, in the primary controller, turning off the power switch when a current in the primary winding reaches a peak current reference level.

19. The method of claim 16, further comprising the secondary-side controller providing the turn-on signal to the primary-side controller through an opto-coupler.

20. The method of claim 16, further comprising the secondary-side controller providing the turn-on signal to the primary-side controller through a second transformer.

21. The method of claim 16, further comprising the primary-side controller detecting a fall edge or a rising edge of the turn-on signal from the secondary-side controller.

* * * * *